Patented May 22, 1928.

1,670,505

UNITED STATES PATENT OFFICE.

FRITZ GÜNTHER, OF LUDWIGSHAFEN-ON-THE-RHINE, GERMANY, ASSIGNOR TO GRASSELLI DYESTUFF CORPORATION, OF NEW YORK, N. Y., A CORPORATION OF DELAWARE.

MANUFACTURE OF SIDE-CHAIN AROMATIC COMPOUNDS.

No Drawing. Application filed March 2, 1927, Serial No. 172,210, and in Germany March 3, 1926.

I have found that aromatic compounds, alkylated, aralkylated or cycloalkylated in the nucleus, may be obtained by treating aromatic compounds with acid sulfuric acid esters of alcohols having 3 or more carbon atoms in the molecule, with or without the use of condensing agents. If the operation be carried out energetically, i. e. with a large quantity of sulfuric acid or at comparatively high temperatures or with both these conditions, sulfonation of the aromatic compounds may take place at the same time.

The process according to the present invention is applicable to all kinds of aromatic compounds. Such compounds may belong to the carbocyclic as well as to the heterocyclic series, and they may be mono- or polynuclear compounds. Hydrocarbons as well as derivatives thereof may be employed. As examples of suitable aromatic compounds, benzene and its homologues such as toluene or xylene, naphthalene, anthracene and their homologues, the phenols and naphthols, pyridine, quinoline and the like may be mentioned. The reaction may be carried out with all kinds of aliphatic, aromatic-aliphatic or hydroaromatic alcohols having at least 3 carbon atoms in their molecule.

The following examples will further illustrate how the said invention may be carried out in practice, but the invention is not limited to these examples. The parts are by weight.

*Example 1.*

296 parts of normal-butyl alcohol are converted into the acid sulfuric acid butyl ester by means of 480 parts of chlorsulfonic acid. The resulting ester is then mixed with 256 parts of naphthalene, and the mixture is gradually raised to a temperature of from 60 to 70° C. The reaction begins at about this temperature, and it is preferable to prevent any further rise in the temperature at the commencement. At the end of several hours, the temperature is slowly raised until finally it reaches 95° C., the heating being then continued until a sample of the reaction product dissolves to a clear solution in water. Neutralization is then effected with alkali, or the excess sulfuric acid is precipitated by lime, and the resulting lime salt of the sulfonic acid being converted into the sodium salt.

The normal-butyl alcohol may be replaced by other butyl alcohols, and also by the propyl alcohols, amyl alcohols, cyclohexanol or its homologues and the like. A smaller amount (say one-half) of the sulfuric ester of butyl may also be taken, in which case it is often advantageous to add sulfuric acid.

*Example 2.*

150 parts of isopropyl alcohol are converted into the acid sulfuric acid propyl ester by means of 290 parts of chlorsulfonic acid. The said ester is added at about 20° C. to 195 parts of benzene. The reaction is complete, after the mixture has been stirred for several days at about 20° to 30° C. The product is poured on ice and the oily layer formed separated from the aqueous layer. The oil is boiled with an excess of strong caustic soda solution and then distilled with steam. The resulting distillate is freed from water and subjected to fractional distillation. The resulting products have a higher boiling point than benzene and are probably propylated benzenes.

*Example 3.*

195 parts of benzene are mixed with the acid sulfuric acid propyl ester prepared at about 20° C. from 150 parts of isopropyl alcohol and 290 parts of chlorsulfonic acid. The mixture is stirred for some hours at 25° to 30° C. 300 parts of sulfuric acid of 66° Bé. strength are then added and after some further hours the temperature is slowly raised to 40° to 45° C. The reaction is complete when the mass is completely soluble in water. The product is poured on ice and neutralized with caustic soda solution or converted into the sodium salt by way of the lime salt in the manner described in Example 1.

What I claim is:

1. The process of producing aromatic compounds containing side-chains which consists in acting on an aromatic compound with an acid sulfuric acid ester of an alcohol containing at least 3 carbon atoms.

2. The process of producing aromatic compounds containing side-chains which consists in acting on an aromatic compound with an acid sulfuric acid ester of an alcohol containing at least 3 carbon atoms in the presence of a condensing agent.

3. The process of producing aromatic compounds containing side-chains which consists in acting on an aromatic compound with an acid sulfuric acid ester of an alcohol containing at least 3 carbon atoms in the presence of sulfuric acid.

In testimony whereof I have hereunto set my hand.

FRITZ GÜNTHER.